United States Patent [19]

Uchikawa et al.

[11] 3,954,489

[45] May 4, 1976

[54] METHOD FOR RETARDING THE SETTING TIME OF RAPID HARDENING CEMENT

[75] Inventors: Hiroshi Uchikawa, Funabashi; Hajime Kato, Yokohama, both of Japan

[73] Assignee: Onoda Cement Company, Ltd., Yamaguchi, Japan

[22] Filed: Feb. 21, 1974

[21] Appl. No.: 444,650

[30] Foreign Application Priority Data

Feb. 21, 1973  Japan.................................. 48-20266

[52] U.S. Cl.................................. 106/89; 106/90; 106/92; 106/95; 106/104; 106/315
[51] Int. Cl.² .......................... C04B 7/02; C04B 7/35
[58] Field of Search ............... 106/315, 104, 90, 89, 106/92, 95

[56] References Cited
UNITED STATES PATENTS

| | | | |
|---|---|---|---|
| 2,211,368 | 8/1940 | Dickens | 106/315 |
| 2,292,616 | 8/1942 | Dailey | 106/315 |
| 3,753,748 | 8/1973 | Martin | 106/315 |
| 3,782,992 | 1/1974 | Uchikawa et al. | 106/315 |

*Primary Examiner*—J. Poer
*Attorney, Agent, or Firm*—Oblon, Fisher, Spivak, McClelland & Maier

[57] ABSTRACT

This invention relates to a method for retarding the setting time of rapid hardening cement which comprises adding a boric compound to cement manufactured by adding insoluble anhydrite to clinker powder containing $11CaO.7Al_2O_3.CaX_2$ or adding the clinker to insoluble anhydrite and intergrinding the mixture, and a method for still more retarding the setting time of rapid hardening cement which comprises adding a boric compound to cement containing a set-retarding agent other than the boric compound.

11 Claims, 1 Drawing Figure

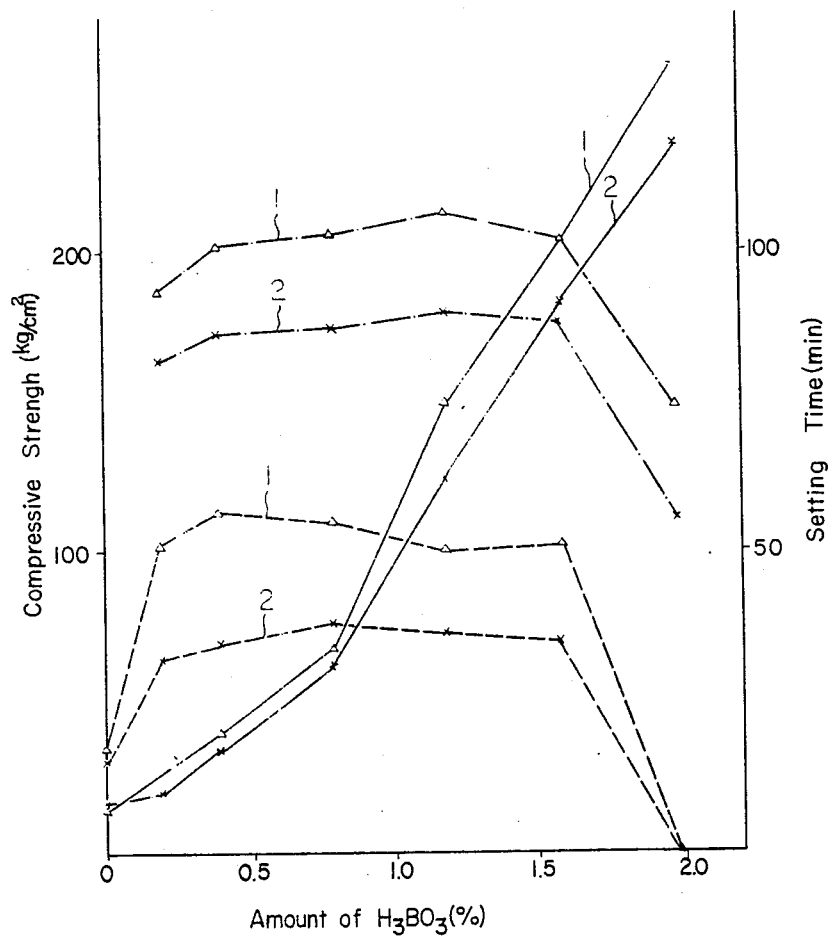

METHOD FOR RETARDING THE SETTING TIME OF RAPID HARDENING CEMENT

BACKGROUND OF THE INVENTION

This invention relates to a method for retarding the setting time of rapid hardening cement manufactured from clinker which contains $11CaO.7Al_2O_3.CaX_2$ (X represent a halogen atom) and solid solutions of $3CaO.SiO_2$, $2CaO.SiO_2$ and $4CaO.Al_2O_3.Fe_2O_3$.

Cement containing $11CaO.7Al_2O_3.CaX_2$ shows instantaneous setting, and lower age strength development at short and longer periods, and therefore it had no practical use. Cement prepared by adding insoluble anhydrite ($CaSO_4$) to the clinker powder in an amount such that the weight ratio of $Al_2O_3/SO_3$ in the cement is present in a range of 0.7-1.8 or by adding insoluble anhydrite to the clinker in the same amount as the above and intergrinding the mixture shows high strength development, but the setting time thereof is too short like 10-15 minutes.

The research group of the present inventors has investigated to retard the setting time of cement prepared from the clinker and invented that (1) cement obtained by adding insoluble anhydrite to the clinker powder or intergrinding a mixture of insoluble anhydrite and the clinker in an amount such that the weight ratio of $Al_2O_3/SO_3$ in the cement is present in a range of 0.7-1.8, shows retarded setting time, (2) cement having retarded setting time, excellent workability and increased initial and longer age strengths can be obtained by adding insoluble anhydrite or a mixture of insoluble anhydrite and gypsum hemihydrate ($CaSO_4.½ H_2O$) to the clinker in an amount such that the weight ratio of the mixture is present in a range of 0.7-1.8 and then mixing at least one compound selected from the group consisting of sulphates, nitrates and chlorides of potassium, sodium, magnesium, calcium, aluminium and ammonium (exclusive of insoluble anhydrite and gypsum hemihydrate) with mixing water (U.S. Pat. application Ser. No. 211,307, now U.S. Pat. No. 3,782,992), (3) cement having retarded setting time can be obtained by adding insoluble anhydrite and at least one compound such as saccharides, sodium hydrogen carbonate, water soluble phosphates, aliphatic carboxylic acids, fluorosilicates, sodium silicates, lignin sulphonic acid, sulphuric acid esters of higher alcohols and alkyl sulphonate to the clinker wherein the anhydrite is present in an amount such that the weight ratio of $Al_2O_3/SO_3$ in the cement is 0.7-1.8 (U.S. application Ser. No. 253,352, now U.S. Pat. No. 3,864,138) and (4) cement having shortened setting time even at low temperature is prepared by adding at least one carbonate such as calcium carbonate, sodium carbonate, potassium carbonate and magnesium carbonate or a mixture of at least one carbonate as shown above and at least one sulphate such as calcium sulphate, sodium sulphate, potassium sulphate and magnesium sulphate to the clinker in an amount such that the weight ratio of $Al_2O_3/SO_3$ in the cement is present in a range of 0.6-1.8 (U.S. application Ser. No. 309,805, now U.S. Pat. No. 3,819,389).

One object of the present invention is to manufacture cement wherein the setting time thereof is retarded longer than that of cement produced from clinker containing $11CaO.7Al_2O_3.CaX_2$ in the prior art and the high strength at short and longer periods is developed.

This object and other objects of the present invention as hereinafter will become more readily apparent can be attained by adding at least a boric compound such as boric acid, boric acid anhydride and borates such as borax to the mixture of the clinker and anhydrite or by adding the boric compound to the cements produced by the above process 1-4. Especially the setting time of cement manufactured by adding the boric compound to the cement produced by the above process 4 can be controlled at higher temperature and even at lower temperature.

The results of the experiments are illustrated as follows.

The clinker containing $11CaO.7Al_2O_3.CaF_2$ was obtained by mixing powders of clay, bauxite, lime stone and fluorspar, intergrinding the mixture, granulating it and firing the granules in a rotary kiln at 1300°-1350°C. The chemical and mineral compositions of the clinker thus obtained are shown in Table 1.

Table 1

| Chemical Composition (%) | | | | | | Mineral Composition (%) | |
|---|---|---|---|---|---|---|---|
| $SiO_2$ | $Al_2O_3$ | $Fe_2O_3$ | CaO | MgO | Total | $11CaO.7Al_2O_3.CaF_2$ | $3CaO.SiO_2$ |
| 17.3 | 14.0 | 2.5 | 61.9 | 1.0 | 96.7 | 24.5 | 50.7 |

Insoluble anhydrite was prepared by firing phosphogypsum at 800°-900°C, grinding the fired gypsum to a specific surface area of about 8100 cm²/g (Blaine). The chemical composition of the insoluble anhydrite thus obtained is shown in Table 2.

Table 2

| Chemical composition of anhydrite (%) | | | | | |
|---|---|---|---|---|---|
| CaO | $SO_3$ | $SiO_2+R_2O$ | $P_2O_5$ | F | Total |
| 36.0 | 54.4 | 5.9 | 3.42 | 0.23 | 99.95 |

Experiment 1

Cement (sample I) was prepared by adding insoluble anhydrite to the clinker ground to the specific surface area of 5500 cm²/g (Blaine) in an amount such that the weight ratio of $Al_2O_3/SO_3$ in the cement was present 1.1 and cement (sample II) was prepared by adding 3 parts (weight) of calcium carbonate to 97 parts (weight) of the clinker, intergrinding the mixture to the specific surface area of 5500cm²/g (Blaine) and adding insoluble anhydrite to the mixture in an amount such that the weight ratio of $Al_2O_3/SO_3$ in the cement was present to 1.1. Various amounts of boric acid were added to both cements and the setting times and compressive strengths of both cements thus obtained were tested. The relations of the quantities of the added boric acid to the setting times and compressive strengths of cement mortars are shown in the attached FIGURE. In the FIGURE, the broken lines and chain lines signify the compressive strengths of 3 hours and 1 day respectively and numerals 1 and 2 signify sample II and I respectively.

These results show that the setting times of the mortars of sample I and II were retarded by adding boric acid and the strengths of the hardened mortar were increased in the specified range of the added amount of boric acid and the setting time of the mortars of sample II were still more retarded and the strength thereof were still more increased with the addition of boric acid than the mortars from sample I.

Experiment 2

Cement (sample III) was prepared by mixing 96 parts (wt.) of the clinker, 3 parts (wt.) of calcium carbonate and 1 part (wt.) of sodium sulphate, intergrinding the mixture to the specific surface area of 5500cm$^2$/g (Blaine) and adding to the mixture insoluble anhydrite in an amount such that the weight ratio of $Al_2O_3/SO_3$ in the cement was present 1.1. The setting times and compressive strengths of the mortars prepared by adding various amounts of boric acid or citric acid to the cement were tested at 5°–30°C. The results are shown in Table 3.

From the results shown in Table 4, it becomes clear that the retarding effect of sodium sulphate or cane sugar on the setting time of mortar of sample I was more increased and, in addition, the compressive strength of the mortar was increased with the addition of sodium borate; and the simultaneous addition of sodium sulphate, cane sugar and boric acid to the sample I increased the retarding effect than the addition of sodium sulphate, cane sugar or the mixture of sodium sulphate and cane sugar thereto, but the strength of the mortar did not increase with the simultaneous addition. And it becomes also clear that the retarding effect on the setting time of the mortar and the compressive strength of the hardened specimen of the mortar of the sample III with cane sugar are increased with the addition of sodium borate.

Above experiments are only several examples among the vast experiments and the present invention is not restricted to only these experiments. The present invention covers all methods for additionally retarding the setting time and for increasing the initial and the Table 3

| Temperature | Additive Name | Quantity (%) | Setting time Initial–Final | Compressive Strength (kg/cm$^2$) | | | | |
|---|---|---|---|---|---|---|---|---|
| | | | | 3hrs. | 6hrs. | 1day | 7days | 28days |
| 5 | — | — | 31 – 47 | 68 | 123 | 188 | 372 | 397 |
| | C.A. | 0.1 | 46 – 64 | 17 | 77 | 193 | 336 | 402 |
| | B.A. | 0.2 | 45 – 60 | 72 | 158 | 226 | 320 | 438 |
| | " | 0.4 | 75 – 100 | 23 | 154 | 238 | 346 | 433 |
| 20 | C.A. | 0.2 | 29 – 37 | 94 | 142 | 206 | 292 | 411 |
| | " | 0.4 | 82 – 97 | 15 | 92 | 217 | 377 | 452 |
| | B.A. | 0.8 | 31 – 37 | 112 | 148 | 203 | 308 | 437 |
| | " | 1.2 | 70 – 82 | 103 | 149 | 219 | 353 | 448 |
| 30 | C.A. | 0.3 | 27 – 33 | 99 | 130 | 192 | 258 | 442 |
| | " | 0.5 | 50 – 62 | 46 | 92 | 190 | 272 | 434 |
| | B.A. | 1.0 | 28 – 35 | 125 | 156 | 213 | 351 | 426 |
| | " | 1.6 | 65 – 72 | 109 | 162 | 218 | 381 | 442 |

Note:
C.A. : Citric Acid,
B.A. : Boric Acid

It becomes clear that the addition of boric acid and citric acid to cement retard the setting time of the cement even at low temperature, and the addition of citric acid decreased the initial strengths between 3–6 hrs, but the addition of boric acid increases even the initial strength at all temperatures.

Experiment 3

Sodium borate, sodium sulphate and cane sugar were added to the sample I and III as in the Experiment 1 and 2 as shown in Table 4 and the setting times and compressive strengths of both cements thus obtained were tested at 20°C. The results shown in Table 4.

longer age strength of the cement which are prepared by adding insoluble anhydrite to the rapid hardening cement clinker powder of 2500–8500cm$^2$/g (Blaine) containing 1–60% by weight of $11CaO.7Al_2O_3.CaX_2$ as a mineral component in an amount such that the weight ratio of $Al_2O_3/SO_3$ in the cement is present in a range of 0.7–1.8 and by additionally adding other set-retarding agent to the above mixture of the clinker and the anhydrite.

The preferable added amount of at least a boric compound such as boric acid, boric acid anhydride and water soluble borate (for example, sodium borate, potassium borate and ammonium borate etc.) may be varied with the content of $11CaO.7Al_2O_3.CaX_2$ in clin- Table 4

| Cement Sample | Additive (%) | | | Setting Time (min.) Initial – Final | Compressive Strength(kg/cm$^2$) | | | | | |
|---|---|---|---|---|---|---|---|---|---|---|
| | Sodium Sulphate | Sodium Borate | Cane Sugar | | 2h | 3h | 6h | 1d | 7d | 28d |
| | 1 | — | — | 18 – 27 | 46 | 57 | 116 | 170 | 237 | 386 |
| | 1 | 0.2 | — | 23 – 33 | 58 | 77 | 133 | 192 | 244 | 401 |
| | 1 | — | 0.2 | 25 – 35 | 51 | 65 | 124 | 178 | 240 | 392 |
| I | 1 | 0.2 | 0.2 | 30 – 41 | 50 | 89 | 138 | 200 | 253 | 404 |
| | — | — | 0.3 | 14 – 22 | 28 | 57 | 114 | 172 | 239 | 394 |
| | — | 0.2 | 0.3 | 20 – 32 | 42 | 73 | 128 | 189 | 242 | 399 |
| | — | 0.4 | 0.3 | 34 – 42 | 38 | 80 | 131 | 188 | 240 | 401 |
| | — | — | 0.3 | 16 – 28 | 42 | 88 | 140 | 203 | 289 | 428 |
| III | — | 0.2 | 0.3 | 24 – 37 | 68 | 128 | 153 | 206 | 311 | 442 |
| | — | 0.4 | 0.3 | 40 – 49 | 60 | 124 | 151 | 204 | 312 | 458 | ker and the temperature at which cement is hardened and generally 0.03–3% by weight based on $B_2O_3$ is preferably used to the total amount of the clinker and insoluble anhydrite. Addition of boric compound of less than 0.03% by weight presents only slight retarding effect, and that of over 3% by weight greatly retards the setting time but decreases the strength of the hardened specimen.

By the embodiment of the present invention, the setting time of the cement can be controlled widely from several minutes to 2 hours and the concrete or mortar presents exellent workability and formability and increase in its compressive strength, especially strength at early age; and therefore, the present invention has inestimable value to its industrial application.

EXAMPLE 1

Cement (sample IV) was prepared by mixing 96 weight parts of the clinker in Table 1, 3 weight parts of calcium carbonate and 1 weight part of sodium sulphate and intergrinding the mixture to 5500 cm²/g (Blaine), and cement (sample V) was prepared by mixing 96.8 weight parts of the same clinker as the above, 3 weight parts of calcium carbonate and 0.2 weight part of sodium borate and intergrinding the mixture to 5500 cm²/g (Blaine), and in addition, cement (sample VI) was prepared by mixing 95.8 weight parts of the same clinker as the above, 3 weight parts of calcium carbonate, 0.8 weight part of sodium sulphate and 0.4 weight part of boric acid and intergrinding the mixture to 5500 cm²/g (Blaine). Insoluble anhydrite was added to these three samples and then gypsum hemihydrate, adipic acid, citric acid and boric acid were added to them as shown in Table 6. The setting time and the compressive strength of the cement mortars were tested at 20° C. The results thus obtained are shown in Table 6.

The setting time and the compressive strength of both cements mortar were tested at 20°C. The results are shown in following Table 7.

Table 7

| Sample | Setting Time(min.) Initial–Final | Compressive Strength(kg/cm²) | | | | | |
|---|---|---|---|---|---|---|---|
| | | 3h | 6h | 1d | 3d | 7d | 28d |
| VII | 15 – 19 | 91 | 112 | 183 | 225 | 302 | 413 |
| VIII | 30 – 38 | 111 | 129 | 201 | 242 | 328 | 433 |

What is claimed is:

1. A method for retarding the setting time of rapid hardening cement which comprises adding at least one boron compound selected from the group consisting of boric acid, boric acid anhydride and water soluble borates to cement manufactured by adding insoluble anhydrite ($CaSO_4$) to clinker which contains $11CaO.7Al_2O_3.CaX_2$ (X represents a halogen atom) and solid solutions of $3CaO.SiO_2$, $2CaO.SiO_2$ and $4CaO.Al_2O_3.Fe_2O_3$ as mineral components.

2. The method for retarding the setting time of rapid hardening cement according to claim 1, wherein the clinker is ground separately to specific surface area of 2500–8500cm²/g (Blaine).

3. The method for retarding the setting time of rapid hardening cement according to claim 1, wherein the clinker contains 1–60% by weight of $11CaO.7Al_2O_3.CaX_2$.

4. The method for retarding the setting time of rapid hardening cement according to claim 1, wherein the insoluble anhydrite is added in an amount such that the weight ratio of $Al_2O_3/SO_3$ in the cement is present in a range of 0.7–1.8.

5. The method for retarding the setting time of rapid hardening cement according to claim 1, wherein the boric compound is added in an amount of 0.03–3% by weight based on $B_2O_3$ to the total weight of the clinker and the insoluble anhydrite.

6. The method for retarding the setting time of rapid hardening cement according to claim 5, wherein the water soluble borate is at least one compound selected from the group consisting of sodium borate, potassium borate, and ammonium borate.

7. The method for retarding the setting time of rapid

Table 6

| Sample | | Additive (part) | | | | | Setting Time(min) | Compressive Strength(kg/cm²) | | | | | |
|---|---|---|---|---|---|---|---|---|---|---|---|---|---|
| Kind | Weight part | Gypsum Anhydrite | Gypsum Semihydrate | Boric Acid | Adipic Acid | Citric Acid | Initial –Final | 3h | 6h | 1d | 3d | 7d | 28d |
| IV | 82.4 | 17 | — | 0.6 | — | — | 23 – 31 | 108 | 142 | 208 | 303 | 363 | 439 |
|    | 82.2 | 17 | — | 0.6 | 0.2 | — | 52 – 68 | 105 | 147 | 215 | 311 | 350 | 443 |
|    | 84.0 | 16 | — | — | — | — | 16 – 24 | 117 | 158 | 203 | 292 | 315 | 411 |
| V  | 84.0 | 14 | 2 | — | — | — | 33 – 42 | 111 | 166 | 220 | 248 | 348 | 439 |
|    | 84.0 | 15.8 | — | — | — | 0.2 | 34 – 47 | 128 | 158 | 206 | 318 | 361 | 454 |
| VI | 84.0 | 16.0 | — | — | — | — | 41 – 55 | 138 | 166 | 224 | 301 | 364 | 452 |

EXAMPLE 2

Cement (sample VII) was prepared by mixing 85 weight parts of the clinker in Table 1 and 15 weight parts of insoluble anhydrite and intergrinding the mixture to 5500 cm²/g (Blaine), and in addition, cement (sample VIII) was prepared by mixing 99.4 weight parts of the above cement and 0.6 weight part of boric acid.

hardening cement according to claim 1, wherein the insoluble anhydrite is mixed to the clinker and the mixture is interground to specific surface area of 2500–8500cm²/g (Blaine).

8. The method for retarding the setting time of rapid hardening cement according to claim 2, wherein to the ground clinker, the insoluble anhydrite in an amount such that the weight ratio of $Al_2O_3/SO_3$ in the mixture of the clinker and the anhydrite is present in a range of 0.7–1.8 and at least one compound selected from the group consisting of sulphates, nitrates and chlorides of potassium, sodium, magnesium, calcium, aluminium and ammonium (exclusive of insoluble anhydrite and gypsum hemihydrate ($CaSO_4 \cdot 1/2H_2O$) ) are added.

9. The method for retarding the setting time of rapid hardening cement according to claim 2, wherein to the ground clinker at least one compound selected from the insoluble anhydrite and a mixture of the insoluble anhydrite and gypsum hemihydrate in an amount such that the weight ratio of $Al_2O_3/SO_3$ in the cement is present in a range of 0.7–1.8 and at least one compound selected from the group consisting of saccharides, sodium hydrogen carbonate, water soluble phosphates, fluorosilicates, alkyl carboxylic acids, sodium silicates, lignin sulphonic acid, sulphuric acid esters of higher alcohols and alkyl sulphonic acids are added.

10. The method for retarding the setting time of rapid hardening cement according to claim 1, wherein to the clinker, at least one carbonate selected from the group consisting of calcium carbonate, sodium carbonate, potassium carbonate and magnesium carbonate is added, the mixture is interground to specific surface area of 2500-8500cm$^2$/g (Blaine) and then the insoluble anhydrite is added to the mixed powder in an amount such that the weight ratio of $Al_2O_3/SO_3$ in the cement is present in a range of 0.7–1.8.

11. The method for retarding the setting time of rapid hardening cement according to claim 10, wherein to the mixture of the clinker and the carbonate, at least one sulphate selected from the group consisting of sodium sulphate, potassium sulphate, aluminium sulphate and magnesium sulphate are added besides.

* * * * *